(12) United States Patent
Schwamberger et al.

(10) Patent No.: US 7,413,348 B2
(45) Date of Patent: Aug. 19, 2008

(54) FLUID DYNAMIC AIR BEARING SYSTEM TO ROTATABLY SUPPORT A MOTOR

(75) Inventors: Stefan Schwamberger, Hermsdorf (DE); Martin Engesser, Donaueschingen (DE)

(73) Assignee: Minebea Co., Ltd., Nagano-ken (JP)

( * ) Notice: Subject to any disclaimer, the term of this patent is extended or adjusted under 35 U.S.C. 154(b) by 348 days.

(21) Appl. No.: 11/348,146

(22) Filed: Feb. 6, 2006

(65) Prior Publication Data

US 2006/0182374 A1 Aug. 17, 2006

(30) Foreign Application Priority Data

Feb. 17, 2005 (DE) ................. 10 2005 007 297

(51) Int. Cl.
*F16C 32/06* (2006.01)
(52) U.S. Cl. ...................................... 384/107
(58) Field of Classification Search ................. 384/100, 384/107–114; 310/90
See application file for complete search history.

(56) References Cited

U.S. PATENT DOCUMENTS

| | | | |
|---|---|---|---|
| 6,020,664 A * | 2/2000 | Liu et al. ................. 310/90 |
| 6,250,808 B1 * | 6/2001 | Ichiyama ................. 384/100 |
| 2002/0191873 A1 * | 12/2002 | Rahman ................. 384/107 |
| 2004/0056547 A1 | 3/2004 | Kull | |
| 2007/0188035 A1 * | 8/2007 | Kim ................. 310/90 |

* cited by examiner

*Primary Examiner*—Thomas R Hannon
(74) *Attorney, Agent, or Firm*—Cooper & Dunham LLP

(57) ABSTRACT

The invention relates to a fluid dynamic air bearing system to rotatably support a motor. The bearing system comprises a stationary shaft, a bearing bush partially enclosing the shaft and connected to the shaft, a bearing plate partially enclosing the shaft and connected to the shaft, the shaft, the bearing bush and the bearing plate between them forming a cavity that is rotationally symmetric with respect to a rotational axis. A component partially enclosing the shaft and having a sleeve-shaped section and at least one disk-shaped section is rotatably accommodated in the cavity, a bearing gap filled with air or a gas separating the surface of the rotatable component from the surfaces facing the rotatable component of the shaft, the bearing bush and the bearing plate. The bearing system further comprises at least one radial bearing formed between the surfaces facing each other of the shaft and of the sleeve-shaped section, at least one radial bearing formed between the surfaces facing each other of the sleeve-shaped section and of the bearing bush, and at least one axial bearing formed between the end surfaces of the disk-shaped section of the rotatable component and the respective surfaces facing these surfaces of the bearing bush and the bearing plate.

11 Claims, 2 Drawing Sheets

FLUID DYNAMIC AIR BEARING SYSTEM TO ROTATABLY SUPPORT A MOTOR

BACKGROUND OF THE INVENTION

The invention relates to a fluid dynamic air bearing system to rotatably support a motor, particularly a spindle motor as employed to drive the storage disk(s) in a hard disk drive. Within the scope of the invention, the term fluid dynamic air bearing system is understood to mean any fluid dynamic bearing system that is operated using a gaseous bearing fluid.

PRIOR ART

Spindle motors substantially comprise a stator, a rotor and at least one bearing system disposed between these two parts. The electrically driven rotor is rotatably supported with respect to the stator with the aid of the bearing system. Fluid dynamic bearing systems are included among the bearing systems that are employed.

A well-known embodiment of a spindle motor having a fluid dynamic bearing system is revealed in U.S. Published Patent Application No. US2004/0056547A1. The bearing system comprises a shaft and a bearing sleeve that has an axial bore to receive the shaft. The shaft rotates freely within the stationary sleeve and, together with the sleeve, forms a radial bearing. The mutually interacting bearing surfaces of the shaft and the sleeve are spaced apart from one another by a thin, concentric, lubricant-filled bearing gap. A surface pattern is formed on at least one of the bearing surfaces which, due to the relative rotary movement between the sleeve and the shaft, exerts local accelerating forces on the lubricant located in the bearing gap. A kind of pumping action is generated in this way resulting in the formation of a homogeneous lubricating film of regular thickness within the bearing gap, the lubricating film being stabilized by means of fluid dynamic pressure zones. The shaft carries a rotor hub on which, for example, the disks of a hard disk drive are disposed. Displacement of the above-described arrangement along the rotational axis is prevented by appropriately designed fluid dynamic axial bearings. The fluid dynamic thrust bearings are preferably formed by the two end faces of a thrust plate arranged at the end of the shaft, one of the end faces of the thrust plate being associated with a corresponding end face of the sleeve and the other end face being associated with the inside end face of a cover. The cover thus forms a counter bearing to the thrust plate and seals the open end of the bearing system, preventing air from penetrating into the bearing gap filled with lubricant. In the illustrated bearing system, a liquid bearing fluid, such as a bearing oil, is used.

If air bearing systems, or gas bearing systems in general, were to be used instead of fluid dynamic oil bearing systems, the lower viscosity of gases compared to oil means that larger bearing surfaces are needed in order to achieve the same bearing stiffness in a gas or air bearing at comparable rotational speeds.

SUMMARY OF THE INVENTION

It is thus the object of the invention to provide a fluid dynamic air bearing system whose bearing stiffness and carrying capacity is comparable to that of an oil bearing system of a similar overall size, in particular of a similar overall height.

This object has been achieved according to the invention by a bearing system having the characteristics outlined in claim 1.

Further preferred and advantageous embodiments of the invention are cited in the subordinate claims.

The fluid dynamic air bearing system according to the invention for the purpose of rotatably supporting a motor comprises a stationary shaft, a bearing bush partially enclosing the shaft and connected to the shaft, a bearing plate partially enclosing the shaft and connected to the shaft, the shaft, the bearing bush and the bearing plate between them forming a cavity that is rotationally symmetric with respect to a rotational axis. A component that partially encloses the shaft having a sleeve-shaped section and a disk-shaped section is rotatably accommodated in the cavity, a bearing gap filled with air or with gas separating the surface of the rotatable component from the surfaces facing the rotatable component of the shaft, the bearing bush and the bearing plate. The bearing system further comprises at least one radial bearing, formed between the surfaces facing each other of the shaft and the sleeve-shaped section, at least one radial bearing, formed between the surfaces facing each other of the sleeve-shaped section and the bearing bush, and at least one axial bearing, formed between the end surfaces of the disk-shaped section of the rotatable component and the respective surfaces facing these surfaces of the bearing bush and the bearing plate.

In one embodiment of the invention, the surfaces separated by the bearing gap of the sleeve-shaped section of the rotatable component and the bearing plate form an extra radial bearing.

On the other hand—where the rotatable component is connected to a rotor—the surfaces separated by a bearing gap and facing each other of the rotor and of the bearing plate can form an extra axial bearing.

According to a further embodiment of the invention, provision can be made for a thrust plate to be disposed at a free end of the sleeve, the thrust plate being accommodated in a recess formed by the bearing bush and a cover plate and being enclosed by the bearing gap, the end surfaces of the thrust plate and the respective surfaces facing these surfaces of the bearing bush and the cover plate each forming an axial bearing.

The radial bearings and axial bearings described above are defined in a well-known manner by surface patterns that are formed on at least one of the paired bearing surfaces and that exert a pumping action on the air or gas found in the bearing gap.

Unlike other well-known bearing arrangements, according to the invention the bearing gap is designed to be continuous and has two open ends that are connected to the surrounding atmosphere.

Each of the two axial bearings that act on the rotating component adjoins an open end of the bearing gap. Depending on the embodiment of the bearing system, either the surface patterns of each axial bearing can exert a pumping action on the air found in the bearing gap which is directed primarily in the direction of the other end of the bearing gap, or the surface patterns of the axial bearings and/or the radial bearings together can exert a pumping action on the air found in the bearing gap which is directed in a defined direction from one end of the bearing gap to the other end of the bearing gap. At the same time, the pumping action of the surface patterns causes air to be drawn from the surroundings and sucked, preferably through a fine filter, into the bearing gap.

The bearing system described above is suitable for the rotatable support of motors, particularly spindle motors. To this effect, the outside diameter of the disk-shaped section of the rotatable component is preferably larger than the outside diameter of the bearing bush and the bearing plate, so that the disk-shaped section of the rotatable component can be easily connected to the rotor of the motor using, for example, an interference fit.

Despite the necessarily larger bearing surfaces compared to those in oil bearings, the air bearing system according to the invention makes it possible to produce motors, and particularly spindle motors, having a small overall size, and particularly a low height, as required in the latest hard disk drives.

BRIEF DESCRIPTION OF THE DRAWINGS

Several embodiments of the invention are described in more detail below on the basis of the drawings. Further characteristics, advantages and possible applications of the invention can be derived from the drawings and their description. The drawings show.

DESCRIPTION OF PREFERRED
EMBODIMENTS OF THE INVENTION

The figures show inner rotor configurations of air bearings according to the invention for hard disk drive motors. The basic principle can be easily adjusted to suit outer rotor motors or disk rotor motors.

Figure 1:
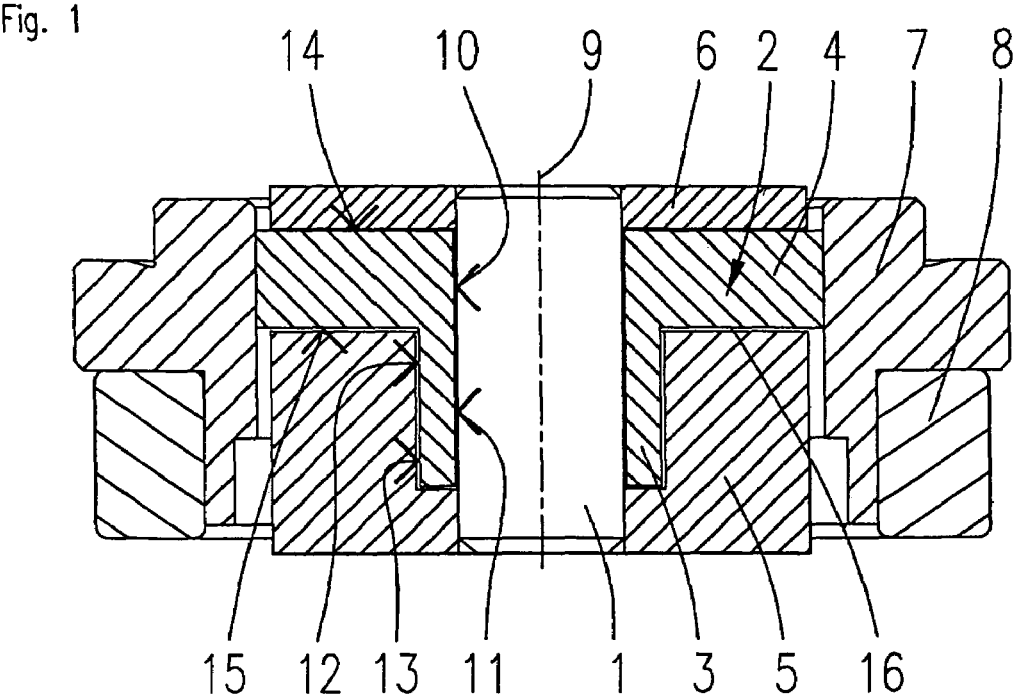
FIG. 1: a schematic sectional view of a first embodiment of the air bearing system according to the invention.

The air bearing in FIG. 1 comprises a stationary shaft 1 and a bearing bush 5 partially enclosing the shaft 1 and connected to the shaft 1. Moreover, a bearing plate 6 partially enclosing the shaft and connected to the shaft is also provided. The bearing bush 5 and the bearing plate 6 are disposed at opposing ends of the shaft 1, such that between the shaft 1, the bearing bush 5 and the bearing plate 6 a cavity that is rotationally symmetric with respect to a rotational axis 9 is formed. A component 2 is rotatably accommodated in this cavity, the outside dimensions of the component 2 being slightly smaller than the dimensions of the cavity, so that a bearing gap 16 filled with air or a gas is formed between the surface of the rotatable component 2 and the surfaces facing the rotatable component of the shaft 1, the bearing bush 5 and the bearing plate 6. The rotatable component 2 comprises a sleeve-shaped section 3 largely enclosing the shaft 1, and a disk-shaped section 4 that is preferably disposed at one end of the sleeve-shaped section 3 and forms a pronounced collar extending radially outwards. The outside diameter of the disk-shaped section 4 is larger than the outside diameter of the bearing bush 5 or the bearing plate 6 respectively, and is connected to the rotor 7 of a motor. Permanent magnets 8 forming a part of the electromagnetic drive system of the motor are disposed on the rotor 7. The remaining components of the drive system, such as the stator windings, are not illustrated in the drawings.

According to the invention, the air bearing has a large radial bearing surface which is primarily the result of the design of the rotating component 2. Both the inside diameter as well as the outside diameter of the sleeve-shaped section 3 of the component 2 preferably includes several radial bearings. The inner radial bearings 10, 11 are formed by the inner surface of the sleeve-shaped part 3 and the outer surface of the shaft 1. The outer radial bearings 12, 13 are formed by the outer surface of the sleeve-shaped part 3 and the inner surface of the bearing bush 5. The added carrying capacities of these opposing radial bearings 10, 11 and 12, 13 provide the bearing system with greater radial stiffness.

Two large-surface axial bearings 14, 15, formed between the end surfaces of the disk-shaped section 4 of the rotatable component 2 and the respective surfaces facing these surfaces of the bearing bush 5 and of the bearing plate 6, provide the bearing system with its required axial stiffness. The radial bearings 10 to 13 and the axial bearings 14, 15 are defined in a well-known manner by surface patterns that are formed on at least one of the paired bearing surfaces in order to exert a pumping action on the air or gas found in the bearing gap. The designs of such surface patterns, for example, as herringbone grooves (radial bearings) or spiral grooves (axial bearings), are known to a person skilled in the art and are thus not illustrated in detail in the drawings.

In FIG. 1, all the bearings, both the radial bearings 10-13 as well as the axial bearings 14, 15, are shown as symmetric bearings, i.e. bearings having symmetric surface patterns that generate a uniform pumping action in the bearing gap, which means that there is no pumping action directed primarily in one direction.

Unlike a bearing system having a rotating shaft, the use of a stationary shaft 1, as illustrated, makes it possible to fix the bearing arrangement at both ends. This method of fixing the bearing arrangement means that the connection of the shaft 1 and the bearing sleeve 5 can be made correspondingly weak.

Figure 2:
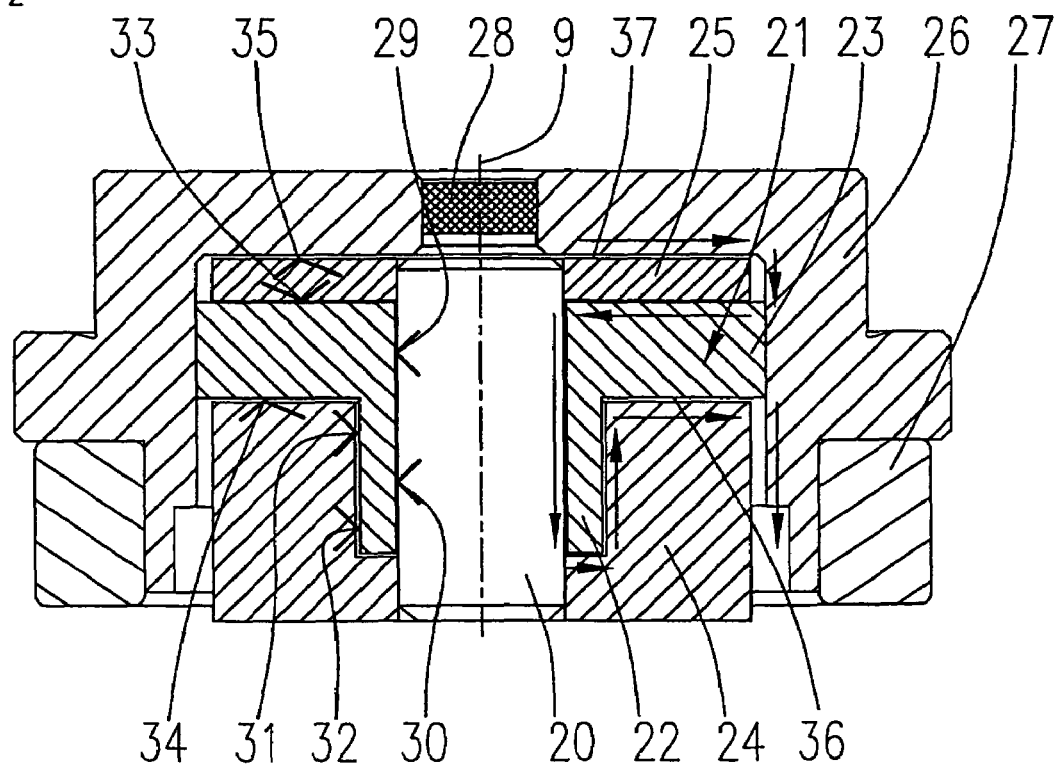
FIG. 2: a schematic sectional view of a second embodiment of the air bearing system according to the invention.

FIG. 2 shows a second embodiment of the bearing system according to the invention whose construction differs only slightly from the bearing system according to FIG. 1. The shaft 20 is fixed in the bearing sleeve 24 at one end and includes a bearing plate 25 at the other end. The rotating component 21 having the sleeve-shaped section 22 and the disk-shaped section 23 is located in the cavity formed by the shaft 20, the bearing sleeve 24 and the bearing plate 25. Because the shaft 20 is only fixed at one end in the bearing bush 24, the rotor 26 is designed to be closed at the top. This makes it possible to filter the air intake through a filter 28 disposed in the rotor 26 when there is a defined pumping direction of the bearing system. At its outside circumference, the rotor 26 again includes magnets 27 belonging to the electromagnetic drive.

In contrast to the bearing arrangement according to FIG. 1, the pumping action of the two axial bearings 33, 35 in the embodiment of FIG. 2 is directed inwards in the direction of the bearing gap 36 in order to compress the air in the bearing gap. The radial bearings 29 to 31 are disposed on the inside as well as the outside diameter of the sleeve-shaped section 22 of the rotatable component 21, as already described above in conjunction with FIG. 1. Two axial bearings 33, 34 are formed by the end surfaces of the disk-shaped section 23 of the rotatable component 21 and the respective surfaces facing these surfaces of the bearing bush 24 and of the bearing plate 25. In this arrangement, it is advantageous if another axial bearing 35 is provided between the lower surface of the rotor 26 and the upper surface of the bearing plate 25. The axial bearing 25 produces a radially outwards directed pumping action in the upper bearing gap 37 on the air or the gas found in the bearing gap 37. As can be seen on the right-hand side of FIG. 2, due to the pumping action of the upper axial bearing 35, the air is sucked through the filter 28, conveyed radially outwards in the bearing gap 37 and reaches bearing gap 36, where, due to the pumping action of the axial bearing 33, it is transported further towards the interior through the bearing gap 36. The pumping action of the axial bearing 34 sucks the air out of the bearing gap 36, so that it can escape outwards between the bearing bush 24 and the rotor 26 into the open air.

Figure 3:
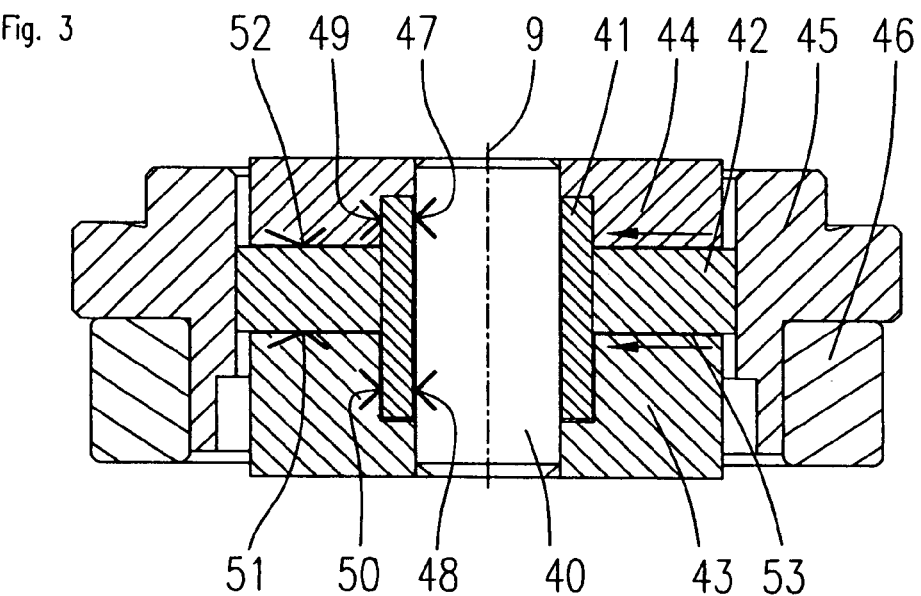
FIG. 3: a schematic sectional view of a third embodiment of the air bearing system according to the invention.

FIG. 3 shows an embodiment of the bearing system according to the invention that is sharply modified vis-à-vis the embodiments of FIGS. 1 and 2. The shaft 40 is fixed between a lower bearing bush 43 and an upper bearing plate 44, such that an appropriate cavity is produced in which a rotatable component taking the form of a sleeve 41 and a disk-shaped plate 42 fixedly connected to the sleeve is rotatably accommodated, a bearing gap 53 remaining between the stationary parts 40, 43, 44 and the rotating parts 41, 42. A rotor 45 is connected to the collar 42 and rotates together with the collar 42 and sleeve 41 about the rotational axis 9 of the shaft 40. Magnets 46 belonging to the electromagnetic drive system are arranged at the outside circumference of the rotor 45.

An even greater radial stiffness is achieved with the bearing arrangement illustrated here compared to the embodiments shown in FIGS. 1 and 2 in that the disk-shaped component 42 is moved further towards the middle of the sleeve 41. The arrangement of the two axial bearings 51 and 52 remains unchanged vis-à-vis FIGS. 1 and 2. The defined pumping direction of the axial bearings 51 and 52 towards the interior of the bearing gap 53 causes the air to be pressed into the bearing gap. The two outer radial bearings 49, 50 and the two inner radial bearings 47, 48 are now located directly opposite each other, resulting in an even distribution of the bearing loads. The sleeve 41 and the disk-shaped component 42 are preferably designed as separate parts, but could consist of one single part as well. This construction in separate parts can of course also be applied to the bearing systems according to FIGS. 1 and 2.

Figure 4:
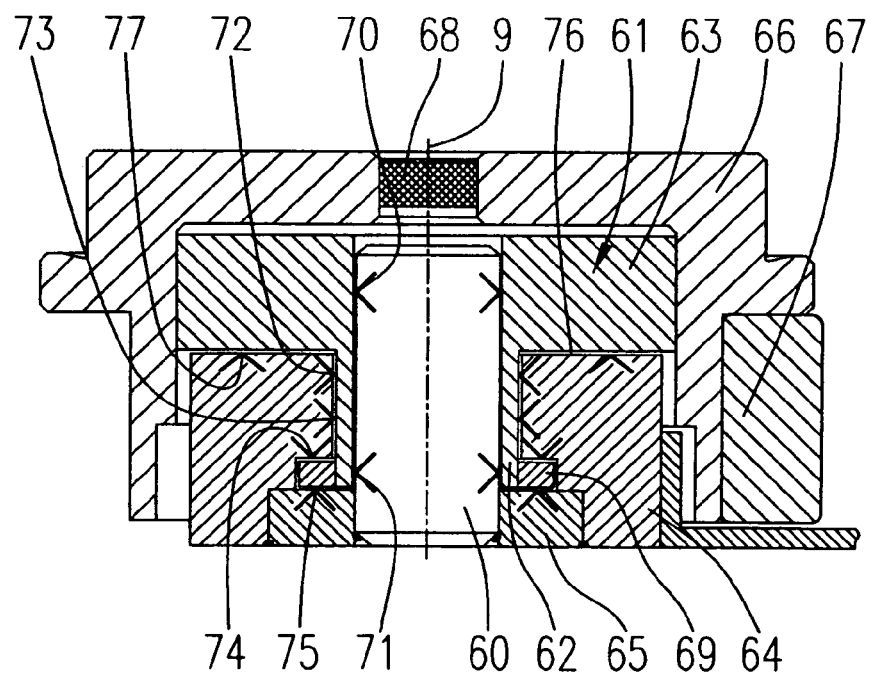
FIG. 4: a schematic sectional view of a fourth embodiment of the air bearing system according to the invention.

FIG. 4 shows a fourth embodiment of the bearing system according to the invention. The shaft 60 is firmly fixed in a bearing plate 65 which in turn is accommodated in a recess of the bearing bush 64. The rotating component 61 comprises a sleeve-shaped section 62, a first disk-shaped section 63 and a second disk-shaped section 69 taking the form of a thrust plate. The disk-shaped sections 63 and 69 are disposed at opposing ends of the sleeve 62. The sleeve-shaped section 62 and the thrust plate 69 are disposed in a cavity which is formed by the shaft 60, the bearing plate 65 and the bearing bush 64 and is enclosed by a bearing gap 76. The upper disk-shaped section 63 of the rotating component 61 carries the rotor 66 that is closed from above and bears the magnets 67. Four radial bearings 70-73 are again provided, the two inner radial bearings 70, 71 being located between the shaft 60 and the inside diameter of the sleeve 62. The two outer radial bearings 72, 73 act between the inside diameter of the bearing bush 64 and the outside diameter of the sleeve-shaped component 62. The axial loads are absorbed by two axial bearings 74, 75 that are formed by the surfaces of the thrust plate 69 and the corresponding surfaces of the bearing bush 64 and the bearing plate 65. The rotor can again include a filter 68 in order to cleanse the air reaching the bearing gap 76 of particles of dirt. A defined pumping direction of the axial bearings 74, 75 or the radial bearings 70-73 respectively causes the air to be drawn from the outside and sucked through the filter 68 into the bearing gap 76.

A further axial bearing 77 can be formed between the bearing bush 64 and the disk-shaped section 63 of the rotatable component 61.

IDENTIFICATION REFERENCE LIST

1 Shaft
2 Rotatable component
3 Section (sleeve-shaped)
4 Section (disk-shaped)
5 Bearing bush
6 Bearing plate
7 Rotor
8 Magnet
9 Rotational axis
10 Radial bearing
11 Radial bearing
12 Radial bearing
13 Radial bearing
14 Axial bearing
15 Axial bearing
16 Bearing gap
20 Shaft
21 Rotatable component
22 Section (sleeve-shaped)
23 Section (disk-shaped)
24 Bearing bush
25 Bearing plate
26 Rotor
27 Magnet
28 Filter
29 Radial bearing
30 Radial bearing
31 Radial bearing
32 Radial bearing
33 Axial bearing
34 Axial bearing
35 Axial bearing
36 Bearing gap
37 Bearing gap
40 Shaft
41 Sleeve
42 Plate (disk-shaped)
43 Bearing bush
44 Bearing plate
45 Rotor
46 Magnet
47 Radial bearing
48 Radial bearing
49 Radial bearing
50 Radial bearing
51 Axial bearing
52 Axial bearing
53 Bearing gap
60 Shaft
61 Rotatable component
62 Section (sleeve-shaped)
63 Section (disk-shaped)
64 Bearing bush
65 Bearing plate
66 Rotor
67 Magnet
68 Filter
69 Thrust plate
70 Radial bearing
71 Radial bearing
72 Radial bearing
73 Radial bearing
74 Axial bearing
75 Axial bearing
76 Bearing gap
77 Axial bearing

What is claimed is:

1. A fluid dynamic air or gas bearing system to rotatably support a motor comprising: a stationary shaft (1;20;40;60), a bearing bush (5;24;43;64) partially enclosing the shaft and connected to the shaft, a bearing plate (6;25;44;65) partially enclosing the shaft and connected to the shaft, the shaft, the bearing bush and the bearing plate between them forming a cavity that is rotationally symmetric with respect to a rotational axis (9), a component (2;21;41,42;61) partially enclosing the shaft and rotatably accommodated in the cavity having a sleeve-shaped section (3;22;41;62) and at least one disk-shaped section comprising a thrust plate (4;23;42;63,69), a bearing gap (16;36;37;53;76) filled with air or a gas which separates the surface of the rotatable component from the surfaces facing the rotatable component of the shaft, the bearing bush and the bearing plate, at least one radial bearing (10,11;29,30;47,48;70,71) formed between the surfaces facing each other of the shaft and of the sleeve-shaped section, at least one radial bearing (12,13;31,32;50;72,73) formed between the surfaces facing each other of the sleeve-shaped section and of the bearing bush, and at least one axial bearing (14,15;33,34;51,52;74,75) formed between the end surfaces of the disk-shaped section of the rotatable component and the respective surfaces facing these surfaces of the bearing bush and the bearing plate.

2. A fluid dynamic air or gas bearing system according to claim 1, characterized in that the surfaces separated by the bearing gap (53) and facing each other of the sleeve-shaped section (41) of the rotatable component and the bearing plate (44) form an additional radial bearing (49).

3. A fluid dynamic air or gas bearing system according to claim 1, characterized in that the surfaces separated by the bearing gap (37) and facing each other of a rotor (26) connected to the rotatable component (21) and of the bearing plate (25) form an additional axial bearing (35).

4. A fluid dynamic air or gas bearing system according to claim 1, characterized in that [a]the thrust plate (69) is disposed at the free end of the sleeve (62) of the rotatable component (61), the thrust plate being accommodated in a recess formed by the bearing bush (64) and [a]the bearing plate (65) and being enclosed by the bearing gap (76), the end surfaces of the thrust plate and the respective surfaces facing these surfaces of the bearing bush and the cover plate each forming the axial bearing (74;75).

5. A fluid dynamic air or gas bearing system according to claim 1, characterized in that the bearing gap is designed to be continuous and has two open ends.

6. A fluid dynamic air or gas bearing system according to claim 1, characterized in that each axial bearing (14,15;33,34;51,52,77) associated with the disk-shaped section adjoins an open end of the bearing gap.

7. A fluid dynamic air or gas bearing system according to claim 1, characterized in that the outside diameter of the disk-shaped section of the rotatable component is larger than the outside diameter of the bearing bush and the bearing plate, the disk-shaped section of the rotatable component being connected to a rotor (7;26;45;66) of the motor.

8. A fluid dynamic air or gas bearing system according to claim 1, characterized in that each radial bearing (10-13; 29-32; 47-50; 70-73) and each axial bearing (14,15;33-35;51, 52;74,75,77) is defined by surface patterns that are formed on at least one of the paired bearing surfaces and that exert a pumping action on the air or gas found in the bearing gap.

9. A fluid dynamic air or gas bearing system according to claim 8, characterized in that the surface patterns of the axial bearings (51;52) adjoining an open end of the bearing gap generate a pumping action that is primarily directed towards the other end of the bearing gap (53).

10. A fluid dynamic air or gas bearing system according to claim 8, characterized in that the surface patterns of the axial bearings (33-35) and/or of the radial bearings (29-32) generate a pumping action that is directed in a defined direction from one end of the bearing gap (36,37) to the other end of the bearing gap.

11. A fluid dynamic air or gas bearing system according to claim 8, characterized in that the pumping action of the surface patterns causes air or gas to be drawn from the surroundings and sucked through a filter (28; 68) into the bearing gap (36; 37; 76).

* * * * *